US010984264B2

(12) United States Patent
Walter

(10) Patent No.: US 10,984,264 B2
(45) Date of Patent: Apr. 20, 2021

(54) DETECTION AND VALIDATION OF OBJECTS FROM SEQUENTIAL IMAGES OF A CAMERA

(71) Applicant: Conti Temic microelectronic GmbH, Nuremberg (DE)

(72) Inventor: Michael Walter, Heerbrugg (CH)

(73) Assignee: Conti Temic microelectronic GmbH, Nuremberg (DE)

( * ) Notice: Subject to any disclaimer, the term of this patent is extended or adjusted under 35 U.S.C. 154(b) by 14 days.

(21) Appl. No.: 16/323,867

(22) PCT Filed: Sep. 28, 2017

(86) PCT No.: PCT/DE2017/200101
§ 371 (c)(1),
(2) Date: Feb. 7, 2019

(87) PCT Pub. No.: WO2018/059630
PCT Pub. Date: Apr. 5, 2018

(65) Prior Publication Data
US 2019/0213427 A1    Jul. 11, 2019

(30) Foreign Application Priority Data

Sep. 29, 2016    (DE) ................. 10 2016 218 853.4

(51) Int. Cl.
*G06K 9/00*    (2006.01)
*G06K 9/46*    (2006.01)
(52) U.S. Cl.
CPC ........... *G06K 9/00805* (2013.01); *G06K 9/46* (2013.01)

(58) Field of Classification Search
CPC .......... G06K 9/00805; G06K 9/00798; G06K 9/4642; G06K 9/3241; G06K 9/00791;
(Continued)

(56) References Cited

U.S. PATENT DOCUMENTS 6,246,961 B1    6/2001    Sasaki et al.
6,445,809 B1    9/2002    Sasaki et al.
(Continued)

FOREIGN PATENT DOCUMENTS

DE    103 51 778    6/2005
DE    102004046101    9/2006
(Continued)

OTHER PUBLICATIONS

English translation of the International Search Report of the International Searching Authority for International Application PCT/DE2017/200101, dated Jan. 19, 2018, 3 pages, European Patent Office, HV Rijswijk, Netherlands.
(Continued)

*Primary Examiner* — Alex Kok S Liew
(74) *Attorney, Agent, or Firm* — W. F. Fasse

(57) ABSTRACT

A method and a device are for detecting and validating objects from camera images, e.g. for driver assistance systems. The method involves: capturing a series of camera images, detecting a potential collision object in at least one image, determining corresponding features in two consecutive images in the image region of the detected potential collision object, associating the corresponding features with a plane, and validating the potential collision object when the associated plane corresponds to a back plane or a side plane.

14 Claims, 6 Drawing Sheets

(58) Field of Classification Search
CPC .......... G06K 2209/21; G06K 9/00369; G06K 9/4614; G06K 9/4647; G06K 9/4671; G06K 9/6269; G06K 2009/363; G06K 9/00362; G06K 9/00671; G06K 9/00973; G06K 9/46; G06K 9/4604; G06K 9/6255; G06K 9/6256; G06K 2009/4666; G06K 2209/23; G06K 9/00523; G06K 9/00651; G06T 2207/30261; G06T 2207/30252; G06T 2207/10016; G06T 7/246; G06T 2207/20016; G06T 2207/30241; G06T 7/73; G06T 2207/20076; G06T 2207/20081; G06T 2207/30264; G06T 7/231; G06T 7/277

See application file for complete search history.

(56) References Cited

U.S. PATENT DOCUMENTS

| | | | |
|---|---|---|---|
| 6,731,777 | B1 | 5/2004 | Nishigaki et al. |
| 6,906,620 | B2 | 6/2005 | Nakai et al. |
| 7,046,822 | B1 | 5/2006 | Knoeppel et al. |
| 7,330,568 | B2 | 2/2008 | Nagaoka et al. |
| 7,664,314 | B2 | 2/2010 | Stein |
| 7,925,050 | B2 | 4/2011 | Nagaoka et al. |
| 8,005,266 | B2 | 8/2011 | Saka et al. |
| 8,045,759 | B2 | 10/2011 | Mlzutani et al. |
| 8,098,889 | B2 | 1/2012 | Zhu et al. |
| 8,121,348 | B2 | 2/2012 | Hayasaka et al. |
| 9,824,586 | B2 | 11/2017 | Sato et al. |
| 2002/0087269 | A1 | 7/2002 | Sasaki et al. |
| 2004/0220724 | A1 | 11/2004 | Hahn et al. |
| 2006/0178830 | A1 | 8/2006 | Sherony |
| 2009/0169052 | A1 | 7/2009 | Seki et al. |
| 2010/0194886 | A1* | 8/2010 | Asari .................. G06T 7/85 348/148 |
| 2010/0260377 | A1 | 10/2010 | Takahashi |
| 2011/0133917 | A1* | 6/2011 | Zeng ................ G06K 9/6293 340/436 |
| 2013/0010920 | A1* | 1/2013 | Wein ................ G06T 11/008 378/19 |
| 2013/0027196 | A1* | 1/2013 | Yankun ............ G06K 9/00805 340/435 |
| 2014/0161323 | A1 | 6/2014 | Livyatan et al. |
| 2015/0086080 | A1 | 3/2015 | Stein et al. |
| 2015/0332114 | A1 | 11/2015 | Springer |
| 2019/0180121 | A1 | 6/2019 | Walter |
| 2019/0180122 | A1 | 6/2019 | Walter |

FOREIGN PATENT DOCUMENTS

| | | |
|---|---|---|
| DE | 102009028742 | 2/2011 |
| DE | 102015224796 | 6/2017 |
| EP | 2 993 654 | 3/2016 |
| WO | WO 2015/177648 | 11/2015 |

OTHER PUBLICATIONS

PCT International Preliminary Report on Patentability including English Translation of PCT Written Opinion of the International Searching Authority for International Application PCT/DE2017/200101, dated Apr. 2, 2019, 5 paegs, International Bureau of WIPO, Geneva, Switzerland.

German Search Report for German Patent Application No. 10 2016 218 853.4, dated Sep. 8, 2017, 7 pages, German Patent and Trademark Office, Muenchen, Germany, with partial English translation, 5 pages.

Masatoshi Okutomi et al., "Robust Estimation of Planar Regions for Visual Navigation Using Sequential Stereo Images", Proceedings of the 2002 IEEE International Conference on Robotics and Automation, Washington, D.C., vol. 4, May 11, 2002, XP032882657, ISBN: 978-0-7803-7272-6, pp. 3321 to 3327.

Richard Hartley et al., "Tutorial: Multiple View Geometry", CVPR Jun. 1999, https://de.scribd.com/document/96810936/Hartley-Tut-4up, accessed on Sep. 26, 2016, 57 pages.

Johann Prankl et al., "Interactive Object Modelling Based on Piecewise Planar Surface Patches", Computer Vision and Image Understanding, vol. 117, No. 6, Jun. 1, 2013, XP55162053, ISSN: 1077-3142, pp. 716 to 731.

Peng Chang et al., "Stereo-Based Vision System for Automotive Imminent Collision Detection", IEEE Intelligent Vehicles Symposium, University of Parma, Parma, Italy, Jun. 14-17, 2004, XP010727481, ISBN: 978-0-7803-8310-4, pp. 274 to 279.

Prateek Singhal et al., "Top Down Approach to Detect Multiple Planes in Images", Proceedings of the 2014 Indian Conference on Computer Vision Graphics and Image Processing, New York, USA, Jan. 1, 2014, XP055439700, ISBN: 978-1-4503-3061-9, 6 pages.

European Examiner Wim Meurisse, European Office Action dated Mar. 2, 2021 in European Patent Application No. 17 790 952.0, 6 pages, with English partial translation, 3 pages.

Manolis I.A. Lourakis et al., "Detecting Planes in an Uncalibrated Image Pair", Proceedings of the 13th British Machine Vision Conference: Sep. 2-5, 2002, Cardiff University, Jan. 1, 2002, XP055439691, ISBN: 978-1-901725-19-3, pp. 57.1 to 57.10.

* cited by examiner a b c

DETECTION AND VALIDATION OF OBJECTS FROM SEQUENTIAL IMAGES OF A CAMERA

FIELD OF THE INVENTION

The invention relates to a method for detecting and validating objects from images from a camera and can be used in particular in camera-based driver assistance systems.

BACKGROUND INFORMATION

Vehicle identification systems according to the current prior art are mostly classification-based. Classification-based systems are very suitable for identifying patterns which they have seen in their training data. However, it is also necessary to be able to detect and classify objects which deviate slightly from the training data. One known problem is an erroneous detection and classification based on integral parts of an image which are similar to a vehicle. These can result in unnecessary warnings or even interventions in the vehicle control system by a driver assistance system.

U.S. Pat. No. 8,098,889 B2 shows an advanced method for detecting and tracking vehicles from a series of camera images, in which individual images are compared with a set of one or more vehicle classifiers, in order to form vehicle hypotheses.

US 2014/0161323 A1 shows a method for producing dense three-dimensional structures in a road environment from images which are captured with a mono camera.

EP 2 993 654 A1 shows a method for forward collision warning (FCW) from camera images. In this case, an image section in which the ego vehicle will arrive within a predefined time interval is analyzed. If an object is identified there, a collision warning is output.

SUMMARY OF THE INVENTION

It is an object of the present invention to indicate a method for detecting and validating objects from images from a camera.

The following considerations form the starting point of the invention:

Since only the local surroundings are generally observed in an image-based classification of objects or vehicles, an erroneous classification can very easily happen due to structures on the road.

Therefore, a robust validation of a supposedly identified object is necessary, in order to avoid or at least reduce unnecessary or even hazardous driver assistance measures.

If the temporal change in a detection is analyzed, it is possible to identify whether the object detected is a structure on the road or an elevated object by means of the deformation of a patch (image section).

A method according to the invention for detecting objects from a series of images from a vehicle camera comprises the following steps:

a) capturing a series of images by means of the vehicle camera, b) detecting a potential collision object in at least one image, c) determining corresponding features in two consecutive images in the region of the detected potential collision object (in the image), e) associating the determined corresponding features with a plane in space, and g) validating an object, if the associated plane corresponds to an elevated object.

The vehicle camera is preferably configured to capture the surroundings of a vehicle. The surroundings are in particular the surroundings lying in front of the vehicle. The vehicle camera can preferably be integrated into a driver assistance device or can be connected thereto, wherein the driver assistance device is in particular configured to identify objects from the image data provided by the vehicle camera device. The vehicle camera device is preferably a camera which is to be arranged in the interior of the motor vehicle behind the windshield and aimed in the direction of travel. The vehicle camera is particularly preferably a monocular camera.

Individual images are preferably captured by means of the vehicle camera at specific or known points in time, resulting in a series of images.

A potential collision object is in particular detected in at least one image of the series of images in step b) by means of 2D characteristics, e.g. as an image-based object classification. The contents of the image can, in this case, be directly compared with templates or by means of a previously trained classifier. Edge identification, grey/color value analysis of pixels and/or other methods known to the person skilled in the art per se for identifying and classifying objects can be used, in order to generate an object hypothesis or detect a potential collision object in the image.

The correlation of a feature in a first image to the same feature in a second image is designated a correspondence. Corresponding features in two images can also be described as a flux vector which indicates how the feature has moved in the image. A feature can in particular be an image section (or patch), a pixel, an edge or a corner. The two consecutive images (step c)) can be e.g. the image in which the object was detected as the first image, and the subsequently captured image as the second image. The corresponding features in the region of the detected object in the first image and the corresponding region of the second image are then determined. The two consecutive images can also be the images following the image in which the object was detected.

In the context of the present invention, the term "plane" describes the following relationships: on the one hand, a criterion for accumulating (adjacent) corresponding features, i.e. these are considered to be associated if they lie in a common plane in space and develop over time in accordance with the motion of the plane.

Corresponding features accumulated in that manner are subsequently designated as e.g. a "ground plane", because they all lie in the plane which corresponds to the road plane. However, such a ground plane does not extend ad infinitum, but means a partial region of the plane, namely that region in which actually corresponding features are arranged.

If the plane associated (predominantly with the corresponding features in the region of the detected potential collision object) corresponds to an elevated object, the object is validated in step g). In particular, this means that it is validated as a potential collision object. Potential collision objects can be e.g. other vehicles, road users, objects or similar. Potentially preferably means that a collision should be avoided.

Whether a collision occurs depends on the vehicle's ego motion and future trajectory as well as on the movement of the potential collision object. Detected and validated objects can consequently be applied, e.g. within the framework of a Forward Collision Warning, Advanced Emergency Brake (and/or Steering) Assist or other driver assistance functions.

Due to the validation which is independent of the object detection, erroneous warnings or rogue interventions in the vehicle dynamics can be minimized.

According to a preferred embodiment, the method comprises the following step:

c) computing homographies for the determined corresponding features in order to associate these corresponding features with a plane in space.

A homography describes the correspondence of points on one plane between two camera positions or the correspondence of two points in two consecutive images from the vehicle camera. By computing homographies for (adjacent) corresponding features, corresponding features in an image region can, in each case, be associated with a plane in space.

The method advantageously comprises the following steps:

e2) associating the determined corresponding features with an orientation in space predefined by a plurality of planes, and f) associating with the plane in space which produces the smallest reprojection error i.e. back projection error for the determined corresponding features, wherein the reprojection error i.e. back projection error indicates the difference between the measured correspondence of a feature in two consecutive images and the correspondence of the (same) feature predicted from the computed homograph.

One advantageous further development of the method comprises the following step:

e3) associating the determined corresponding features with a ground plane, a back plane or a side plane.

In the case of a coordinate system, in which the x-direction runs horizontally and laterally, the y-direction runs vertically and the z-direction runs in the vehicle longitudinal direction, a ground plane can be predefined normally to the y-direction, a back plane can be predefined normally to the z-direction and a side plane can be predefined normally to the x-direction.

By computing homographies of a ground plane, a back plane and a side plane, an association with one of these planes can be made for the determined corresponding features.

The validation of potential collision objects (elevated objects) can then be carried out for the questionable image region, if the reprojection errors of the back plane and the side plane homographies are lower than the reprojection error of the ground plane homography.

The homographies for the back plane can preferably be computed in accordance with equation (10) or for the ground plane in accordance with equation (9) or for the side plane in accordance with equation (11). In this case, a, b, c are constants, $x_0$, $y_0$, $x_1$, $y_1$ designate correspondences in the second image (index 0) captured at a later point in time t−0, and first image (index 1) captured at an earlier point in time t−1, and $t_x$, $t_y$, $t_z$ are the components of the vector t/d. t describes the translation of the vehicle camera and d describes the distance from a plane (perpendicular to said plane), that is to say along the normal vector of this plane. The components $t_x$, $t_y$, or $t_z$, are also designated below as an "inverse TTC". TTC comes from "time to collision" and results, in one spatial direction, from the clearance i.e. spacing distance divided by the translational speed.

According to one advantageous further development, a detected object can be tracked in an image-based manner in the course of the series of images.

The detected object can preferably be tracked using a bounding box which corresponds e.g. to the imaged front/back of the object. The bounding box should preferably be selected so that it is not too large, so that it is filled as completely as possible by the imaged front/back of the object. If the background is also located in the bounding box, this can lead to correspondences which do not move like the object front/back in the following images.

The bounding box of a preceding image can be advantageously predicted onto the current image by means of a homography for a back plane.

The subject matter of the invention is furthermore a device for detecting objects from a series of images from a vehicle camera comprising a camera control unit and evaluation electronics, wherein the camera control unit is set up or configured a) to capture a series of images by means of the vehicle camera; and wherein the evaluation electronics are set up/configured b) to detect a potential collision object in at least one image, c) to determine corresponding features in two consecutive images in the region of the detected potential collision object (in the image), e) to associate the determined corresponding features with a plane in space, and g) to validate an object, if the associated plane corresponds to an elevated object.

The camera control unit or the evaluation electronics can in particular comprise a microcontroller or processor, a digital signal processor (DSP), an ASIC (Application Specific Integrated Circuit), a FPGA (Field Programmable Gate Array) and the like as well as software for performing the relevant control or evaluation steps. The present invention can consequently be implemented in digital electronic circuits, computer hardware, firmware or software.

BRIEF DESCRIPTION OF THE DRAWINGS

Further features, advantages and effects of the invention are set out by the following description of preferred embodiment examples of the invention, wherein.

DETAILED DESCRIPTION OF EXAMPLE EMBODIMENTS OF THE INVENTION

Figure 1:
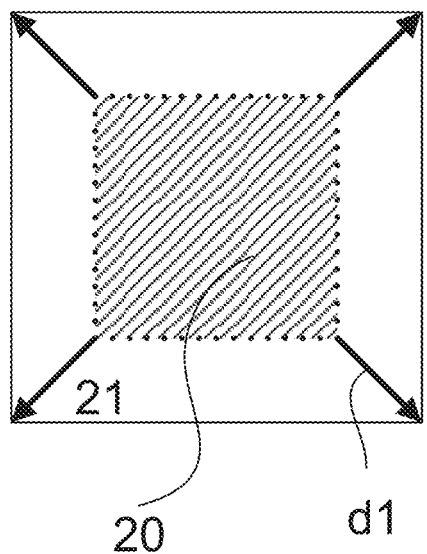
FIG. 1 schematically shows a typical deformation of an approaching back plane.

Parts corresponding to one another are, as a general rule, provided with the same reference numerals in all of the figures.

Figure 8:
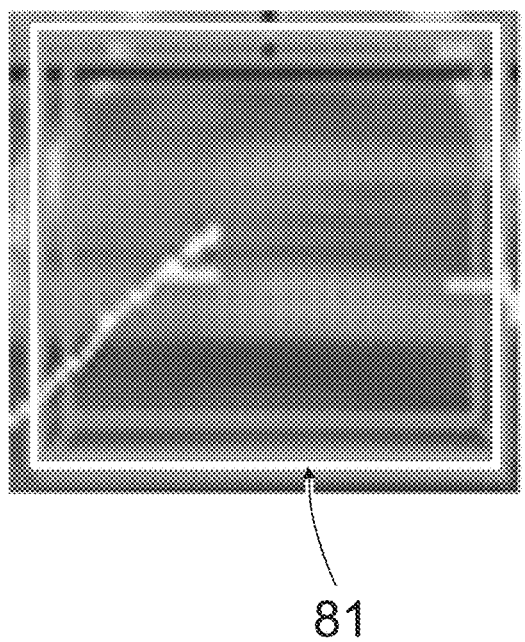
FIG. 8 shows a driving situation which can result in an erroneous identification.
Figure 8:
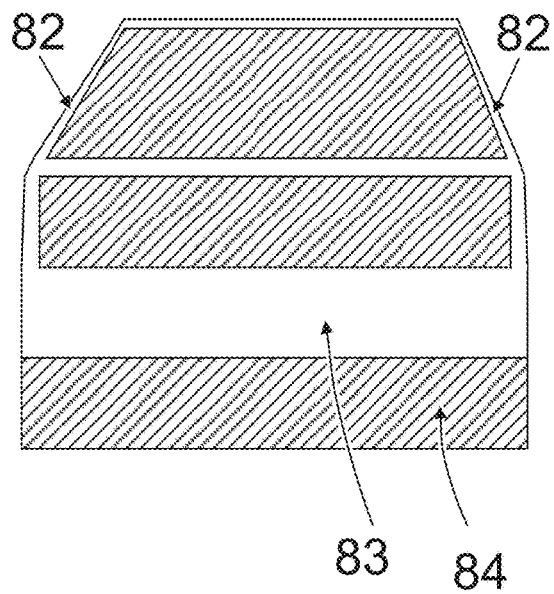
Figure 8:
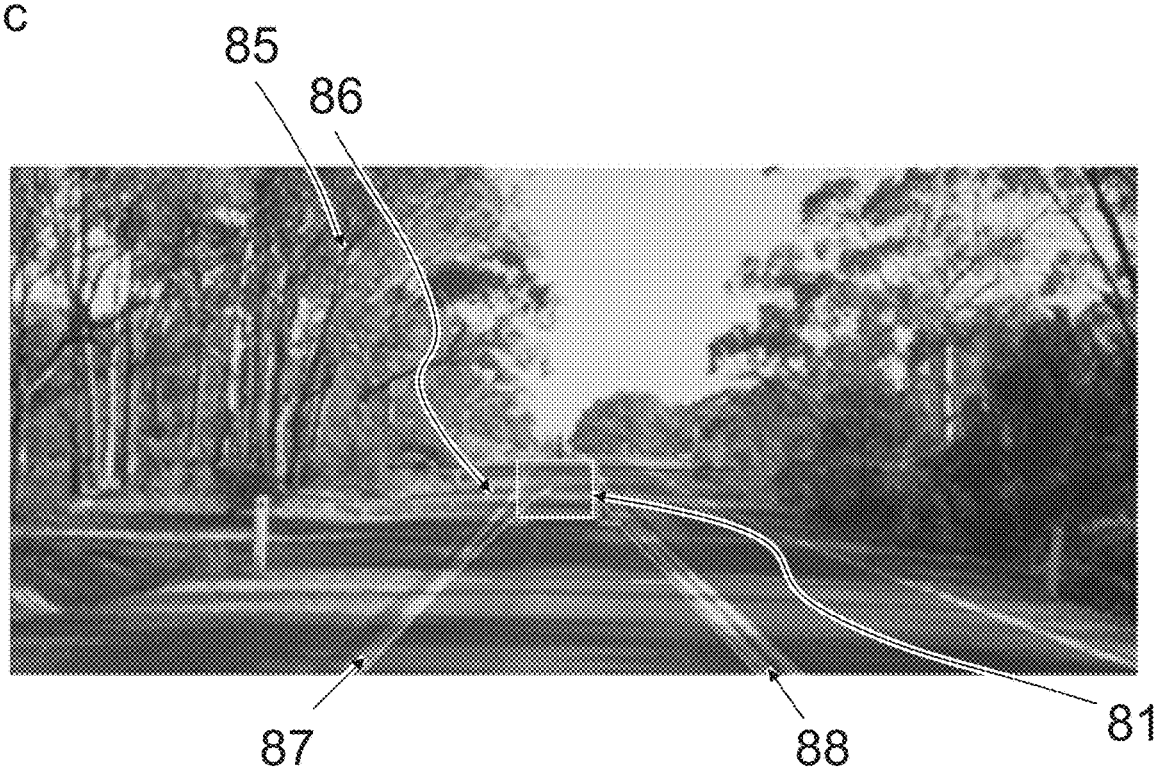

A situation which can result in a rogue vehicle detection is shown in FIG. 8. The vehicles are driving on the left. The local detection by means of a section of an image of the vehicle camera in FIG. 8a shows typical vehicle features. E.g. the shadow under the bumper, the vehicle sides and C-pillars can be seen.

The classifier therefore identifies a relatively large similarity to a rear view of a white/light-colored vehicle, as schematically represented in FIG. 8b. The C-pillar (82), the region of the bumper (83) and a dark region (84) below the bumper are characteristic of such a rear view.

On the other hand, a human observer, on looking at the camera image of the entire scene in FIG. 8c, immediately realizes that the structures in the image section of FIG. 8a are only formed by the shadow cast (86) by the trees (85) at the edge of the road. A conventional classification-based vehicle identification system would, however, in such a case, emit a collision warning to the driver of the ego vehicle or even initiate automatic emergency braking, since the vehicle which is apparently identified is located within the ego lane or within the ego driving corridor (87, 88).

This problem can be avoided by a fusion of camera data with a beam sensor (radar/lidar). However, an additional beam sensor is required for this. These sensors are expensive and will not be extensively available in vehicles within the foreseeable future.

Solutions are presented below, which prevent such malfunctions by means of a robust validation of detected objects simply using a mono camera.

FIG. 1 schematically shows a back plane which occupies the region (20, dotted line) represented by hatching, at an earlier first point in time t−1. At a subsequent second point in time t, i.e. t−0, the clearance or spacing distance between the vehicle camera and the back plane has decreased, resulting in the deformation of the region (21, continuous line) of the back plane in the image as indicated by the arrows (d1). The region (20; 21) is scaled or increased as a consequence of the relative motion of the vehicle camera with respect to the back plane.

Figure 2:
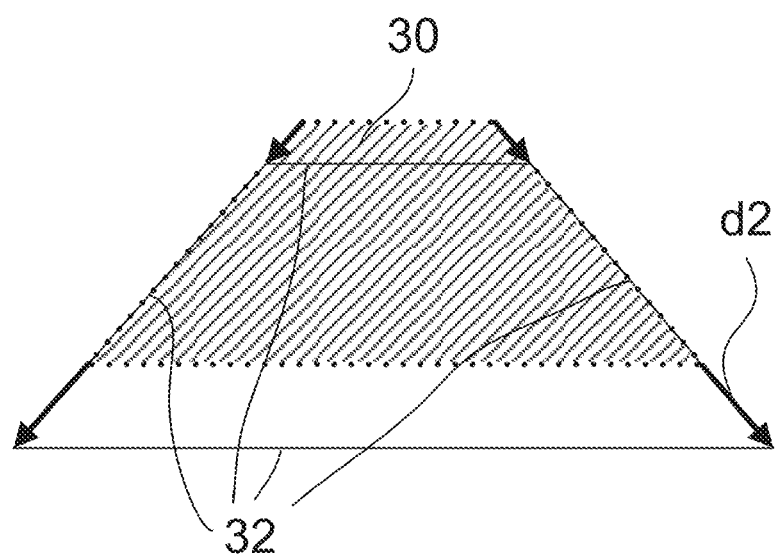
FIG. 2 schematically shows a typical deformation of an approaching ground plane.

FIG. 2 schematically shows a ground plane which occupies the region (30, dotted line) represented by hatching at an earlier first point in time t−1. This could be a section of a road surface, on which the vehicle is driving. As a consequence of the egomotion of the vehicle camera, the region (as represented in the image) changes at a subsequent second point in time t, i.e. t−0, resulting in the deformation of the region (32) of the ground plane as indicated by the arrows (d2). At the second point in time t, the lines designated with 32 delimit the region of the ground plane. Here, the term "ground plane" thus denotes a delimited region on the road surface. The edge region is produced e.g. from signatures (or edge points) on the road surface, which can be tracked in the series of images.

Figure 3:
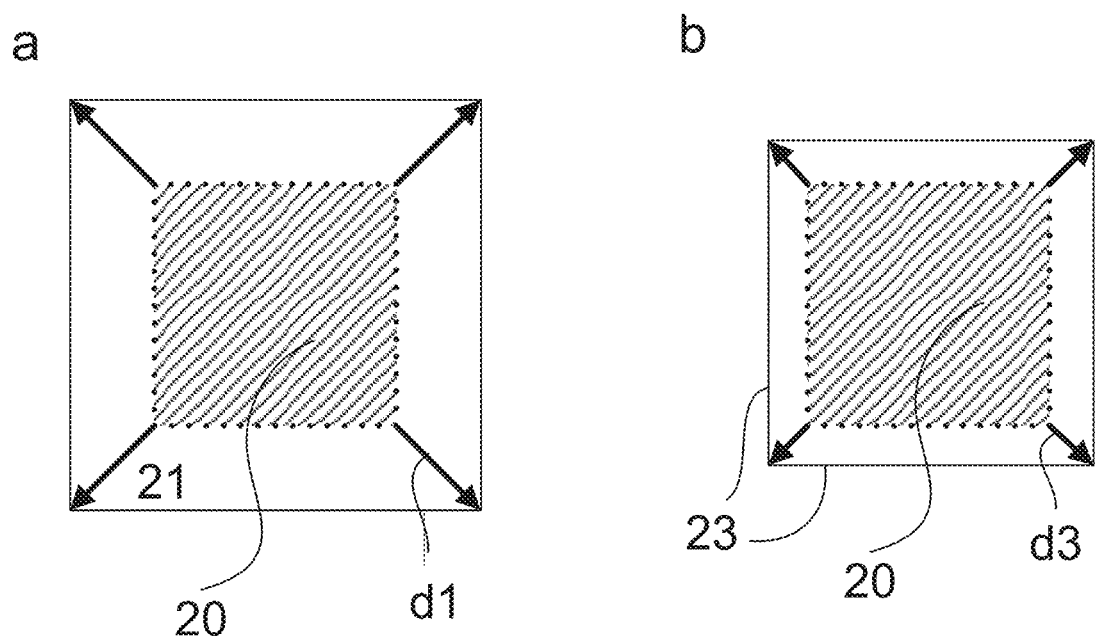
FIG. 3 schematically shows a typical deformation of a) a rapidly approaching back plane and b) a slowly approaching or more distant back plane.

FIG. 3 illustrates the difference between a rapidly approaching back plane (FIG. 3a: 20, 21; deformation dl) and a slowly approaching back plane (FIG. 3b: 20, 23; deformation d3), if at the point in time t−1 the back plane (20) in FIG. 3a has the same clearance or spacing distance from the vehicle camera as the back plane (20) in FIG. 3b.

Alternatively, FIG. 3 could represent the difference between a close back plane (FIG. 3a: 20, 21; deformation dl) and a more distant back plane (FIG. 3b: 20, 23; deformation d3), which are moving e.g. at the same (relative) speed, in which case the object (20, 23) represented in FIG. 3b would be larger in real space than the object (20, 21) represented in FIG. 3a.

If, instead of individual correspondences, multiple adjacent correspondences are observed, objects can be segmented due to different speeds, scalings and deformation.

If it is assumed that the world consists of planes, these can be described by homographies and can be separated as shown below by means of their distance, speed and orientation.

A homography describes the correspondence of points on one plane between two camera positions or the correspondence of two points in two consecutive frames:

$$x_{t0} = H * x_{t1} \text{ wherein} \quad (1)$$

$$x_{t0} = \begin{bmatrix} x_0 \\ y_0 \\ 1 \end{bmatrix}, x_{t1} = \begin{bmatrix} x_1 \\ y_1 \\ 1 \end{bmatrix}.$$

In this case, the vector $x_{t0}$ describes the 3D correspondence at the point in time t−0 of the vector $x_{t1}$ at the point in time t−1. A homography can be computed, in an image-based manner, by knowledge of four point correspondences (cf. Tutorial: Multiple View Geometry, Hartley, R. and Zisserman, A., CVPR June 1999: https://de.scribd.com/document/96810936/Hartley-Tut-4up accessed on Sep. 26, 2016). The relationships indicated at the top left (slide 21) of page 6 of the tutorial can be formulated as follows in the notation of equation 1:

$$\begin{bmatrix} -x_0 & -y_0 & -1 & 0 & 0 & 0 & x_1 x_0 & x_1 y_0 & x_1 \\ 0 & 0 & 0 & -x_0 & -y_0 & -1 & y_1 x_0 & y_1 y_0 & y_1 \\ & & & & \vdots & & & & \end{bmatrix} * \begin{bmatrix} h_1 \\ h_2 \\ h_3 \\ h_4 \\ h_5 \\ h_6 \\ h_7 \\ h_8 \\ h_9 \end{bmatrix} = 0 \quad (2)$$

$$\text{with } H = \begin{bmatrix} h_1 & h_2 & h_3 \\ h_4 & h_5 & h_6 \\ h_7 & h_8 & h_9 \end{bmatrix}.$$

Alternatively, knowing the camera translation t, the rotation R and the distance d along the normal vector n of the plane, the homography can be computed in accordance with equation 3. Equation 3 illustrates that, at a nonzero inverse TTC t/d, planes having a different orientation n can be modelled, and that planes having an identical orientation n can be separated by means of their inverse TTC.

$$H = \left[ R - \frac{t * n'}{d} \right] \quad (3)$$

A homography can be theoretically decomposed into the normal vector n, the rotation matrix R and the inverse TTC t/d. Unfortunately, this decomposition is numerically extremely unstable and sensitive to measuring errors.

If a scene is described by planes, it can be segmented as indicated below.

Figure 4:
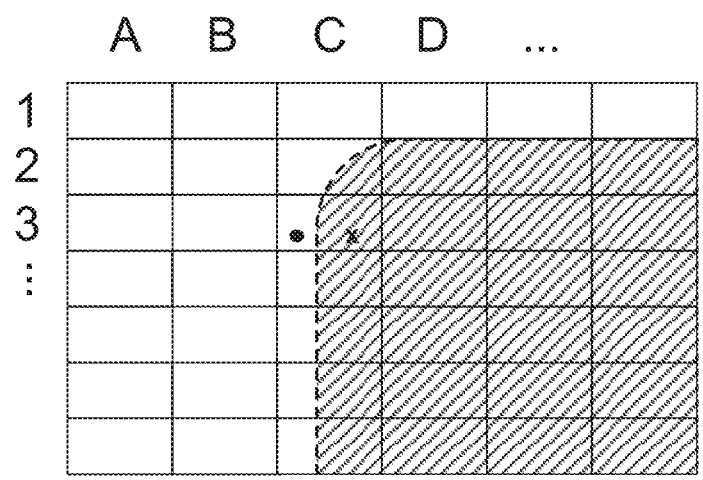
FIG. 4 schematically shows a subdivision of an image having two different segments into cells.

FIG. 4 schematically shows a subdivision into cells (grid, gridlines). The scene is subdivided into NxM initial cells and a clear ID is assigned to each point correspondence. This ID firstly indicates the affiliation to a cell. The ID can subsequently indicate the affiliation to a cluster or an object. An object (in particular a back plane) is represented hatched in the foreground. The background is represented in white. If a cell only comprises one object (cells B3, D3), a homography will describe this cell very well. If, however, a cell contains more than one object (cell C3), the homography will not describe either of the two objects well. If the point correspondences (black dot or black cross or x) are associated with the clusters (or segment) of the adjacent cells (B3 or D3) by means of their reprojection errors, the black dot is associated with the segment of the cell B3 and the black cross is associated with the segment of the cell D3, because the homography or the cell C3 does not describe either the foreground or the background well.

If prior knowledge of a scene exists, the segment sizes can be adjusted to the scene in that e.g. larger regions in the close region of the vehicle or in regions having a positive classification answer can be generated. A dedicated back plane, ground plane, and side plane homography is respectively computed for each segment, as shown in equations 5 to 10.

The computation of the back plane, ground plane, and side plane homography increases the selectivity because a homography with fewer degrees of freedom can only poorly model regions which contain different planes, and consequently, corresponding points will have a higher reprojection error, see FIG. 4. Therefore, the reprojection error $e_i$ is a measure of how well a point x at the point in time t–0 is described by the homography of a plane i of the corresponding point at the time t–1.

$$e_i = x_{t0} - H_i x_{t1}. \quad (4)$$

If the static installation position of the camera and camera rotation are assumed in two different views (e.g. due to knowledge of the camera calibration and due to the computation of the fundamental matrix in a monocular system or due to rotation values of a rotation rate sensor cluster), the inverse TTC t/d can be computed by means of the flux vectors compensated for by the static camera rotation, as is shown below by way of example for a ground plane n'= [010]. If the rotation is not known, it can be approximately replaced by a unit matrix.

If the quotient t/d is substituted by the inverse time to collision $$\begin{bmatrix} t_x \\ t_y \\ t_z \end{bmatrix}$$

in equation 3, it follows that $$\begin{bmatrix} x_0 \\ y_0 \\ 1 \end{bmatrix} = \begin{bmatrix} 0 & t_x & 0 \\ R - 0 & t_y & 0 \\ 0 & t_z & 0 \end{bmatrix} \begin{bmatrix} x_1 \\ y_1 \\ 1 \end{bmatrix} \Rightarrow \begin{bmatrix} x_0 \\ y_0 \\ 1 \end{bmatrix} - R \begin{bmatrix} x_1 \\ y_1 \\ 1 \end{bmatrix} = - \begin{bmatrix} 0 & t_x & 0 \\ 0 & t_y & 0 \\ 0 & t_z & 0 \end{bmatrix} \begin{bmatrix} x_1 \\ y_1 \\ 1 \end{bmatrix}. \quad (5)$$

By introducing the constants a, b, c, wherein $$\begin{bmatrix} a \\ b \\ c \end{bmatrix} := R \begin{bmatrix} x_1 \\ y_1 \\ 1 \end{bmatrix}$$

equation 5 produces the simplified form:

$$\begin{bmatrix} x_0 \\ y_0 \\ 1 \end{bmatrix} - \begin{bmatrix} a \\ b \\ c \end{bmatrix} = - \begin{bmatrix} t_x y_1 \\ t_y y_1 \\ t_z y_1 \end{bmatrix} \Rightarrow \begin{bmatrix} x_0 \\ y_0 \\ 1 \end{bmatrix} = \begin{bmatrix} a \\ b \\ c \end{bmatrix} - \begin{bmatrix} t_x y_1 \\ t_y y_1 \\ t_z y_1 \end{bmatrix}. \quad (6)$$

The result of standardizing the homogeneous coordinates is:

$$x_0(c - t_z y_1) = a - t_x y_1 \quad (7)$$

$$y_0(c - t_z y_1) = b - t_y y_1 \quad (8)$$

For more than one measurement, an equation system of the form Mx=v with a vector x to be established, a matrix M and a vector v (see equation 9) is produced, which can be solved for at least three image correspondences as sampling points by e.g. a singular value decomposition or a least squares method:

$$\begin{bmatrix} x_0 c - a \\ y_0 c - b \\ \vdots \end{bmatrix} = \begin{bmatrix} -y_1 & 0 & y_1 x_0 \\ 0 & -y_1 & y_1 y_0 \\ \vdots & & \end{bmatrix} * \begin{bmatrix} t_x \\ t_y \\ t_z \end{bmatrix}. \quad (9)$$

The back and side plane homographies can be deduced similarly and produce:

$$\begin{bmatrix} x_0 c - a \\ y_0 c - b \\ \vdots \end{bmatrix} = \begin{bmatrix} -x_1 & 0 & x_1 x_0 \\ 0 & -x_1 & x_1 y_0 \\ \vdots & & \end{bmatrix} \begin{bmatrix} t_x \\ t_y \\ t_z \end{bmatrix} \quad (10)$$

$$\text{or } \begin{bmatrix} x_0 c - a \\ y_0 c - b \\ \vdots \end{bmatrix} = \begin{bmatrix} -1 & 0 & x_0 \\ 0 & -1 & y_0 \\ \vdots & & \end{bmatrix} \begin{bmatrix} t_x \\ t_y \\ t_z \end{bmatrix}. \quad (11)$$

In order to segment larger objects consisting of multiple cells, adjacent cells can be combined in a further step, in that the reprojection errors $\Sigma x_{t0}^i - H_j x_{t1}^i$ or $\Sigma x_{t0}^j - H_i x_{t1}^j$ are computed by means of sampling points (see point 1 below: RANSAC) of the adjacent segments j and i and their homographies. Two adjacent clusters are combined, if $\Sigma x_{t0}^i - H_j x_{t1}^i$ is less than $\Sigma x_{t0}^i - H_i x_{t1}^i$ or e.g. the reprojection error standardized for the predicted flux length is below an adjustable threshold. In particular, two adjacent clusters can be combined, if $\Sigma x_{t0}^i - H_j x_{t1}^i$ is less than $\Sigma x_{t0}^i - H_i x_{t1}^i$ and the two reprojection errors $\Sigma x_{t0}^i - H_j x_{t1}^i$ and $\Sigma x_{t0}^i - H_i x_{t1}^i$ fall below a threshold standardized for the flux length. Alternatively, reprojection errors can be used as potentials in a graph and a global solution can be computed. The compactness of the clusters can, in this case, be established via the edge potentials in the graph.

If the segments have been combined, the homographies are computed again and the point correspondences are associated with the clusters having the smallest reprojection error. If only directly neighboring clusters are observed, very compact objects can be generated. If the minimum error exceeds an adjustable threshold, new (cluster/object) IDs are assigned to the correspondences, in order to be able to identify partially concealed objects or objects having a slightly different TTC. By adjusting the threshold, the resolution of (slightly) different objects can be adjusted.

The reprojection errors can be provided with a bias which reduces the costs for related regions or a bias which increases the costs for an ID change, if point correspondences were to have the same ID affiliation over a longer period of time.

Figure 5:
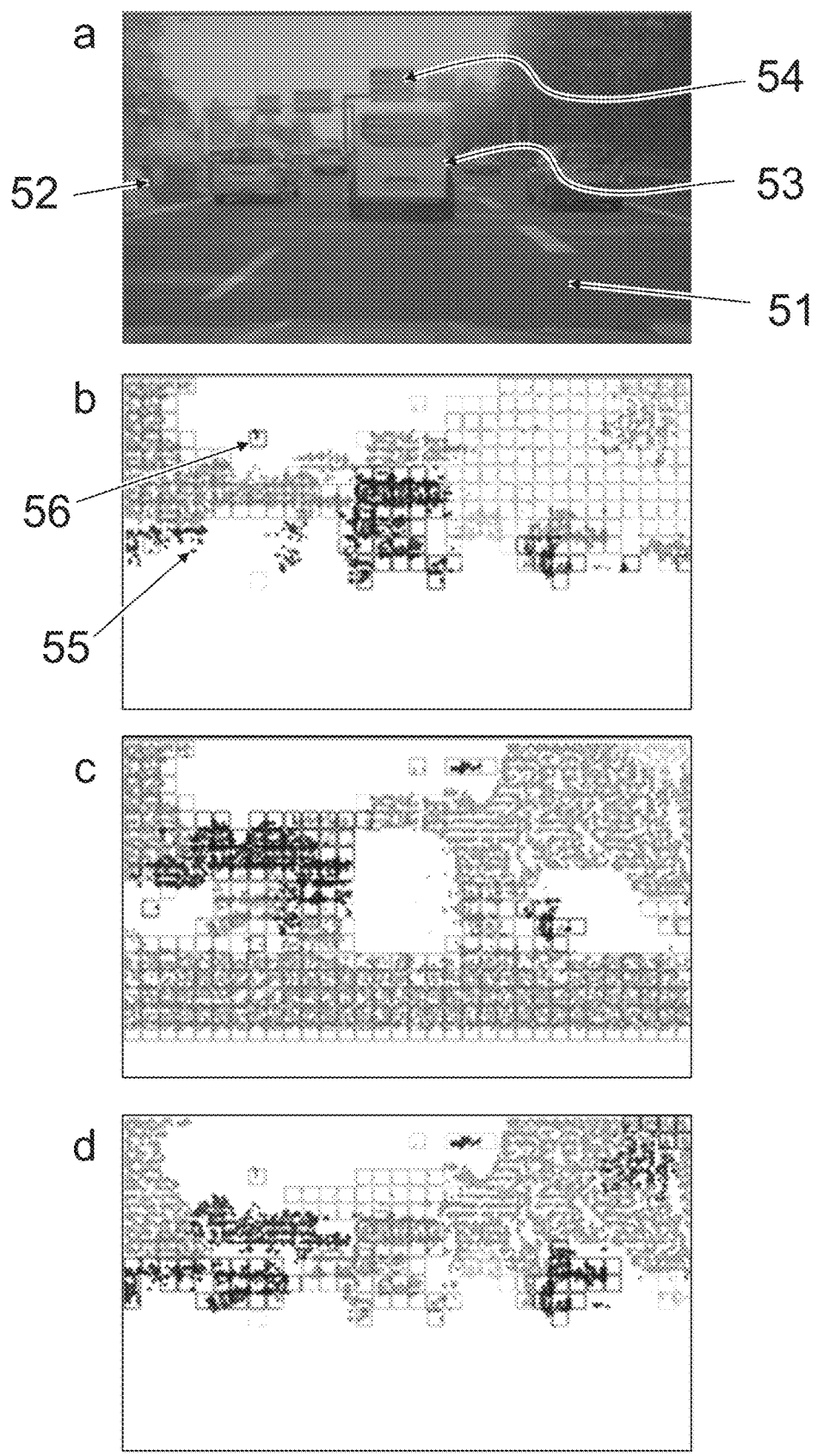
FIG. 5 shows segmenting results following a third iteration step.

FIG. 5 shows one example of a scene segmentation:

FIG. 5a shows an image which has been captured by a vehicle camera which is arranged in the interior of the vehicle and records the surroundings lying ahead through the windshield. A three-lane road (51), e.g. a motorway, can be seen. The lanes are separated by appropriate lane markings. Vehicles are driving on all three lanes. The vehicle (53) driving ahead on the ego lane possibly conceals further vehicles driving ahead, which are located on the ego lane. A structural elevated delimitation (52) with respect to the opposite carriageway is located on the left of the three-lane road. A shoulder or breakdown lane, which is delimited to the right by a guardrail, behind which there is woodland, is located to the right of the three-lane road (51). Sign gantries (54) can be identified some distance in front of the ego vehicle, one of which spans the three-lane road (51).

This scene can be segmented in a similar way to the method described by means of FIG. 4. In FIGS. 5b to 5d, cells (56) can be identified. Point correspondences (55) are represented in the cells. The association of a cell (56) with a segment is represented by means of the color of the cell border or the point correspondences (55).

FIG. 5b shows the red channel of the segmented image, FIG. 5c shows the green channel and FIG. 5d shows the blue channel.

Different segments have been provided with different colors. A segment, which is green in the original, extends over the lowest five to six lines (accordingly represented in white in FIGS. 5b and 5d and without a cell border). This segment corresponds to the ground plane, that is to say the surface of the road (51) on which the ego car is driving.

A further segment can be identified in the middle of the image, in the original it is pink. It therefore has high red values in FIG. 5b, weaker blue values in FIG. 5d and no green values in FIG. 5c. This segment corresponds to the back plane of the (transporter i.e. delivery van) vehicle (53) driving ahead on the ego lane.

The segmenting result shown was determined without prior knowledge of the scene in only three iteration steps. This shows the enormous speediness and performance of an embodiment of the invention by temporal integration.

Figure 6:
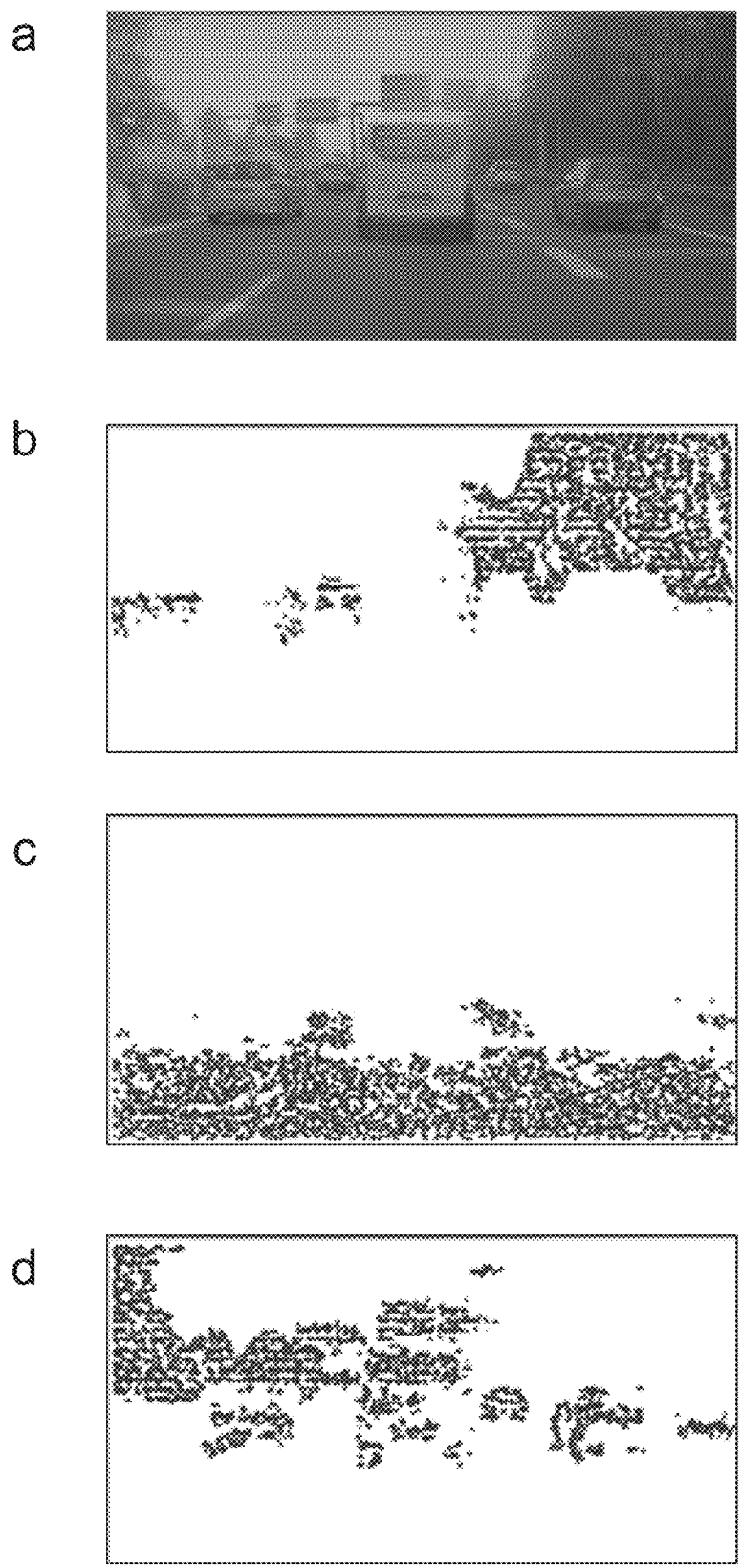
FIG. 6 shows a plane orientation for validation of potential collision objects.

FIG. 6 shows a determination of the orientation of planes in the scene already described in FIG. 5. FIG. 6a again shows, for the purposes of orientation, the surrounding situation according to FIG. 5a.

All of the correspondences which are associated with a side plane are shown in FIG. 6b. The correspondences at the left edge have been associated with a right side plane, which is correct because the right side of the structural delimitation (52) with respect to the opposite carriageway is located there in the image. The correspondences in the right half of the image have been associated with the left side planes, which is likewise correct, because the "left side" of the road peripheral development or planting of vegetation is located there in the image. FIG. 6c shows which correspondences are associated with a ground plane, which is correct, because the surface of the road (51) can be seen there in the image.

FIG. 6d shows which correspondences are associated with a back plane. This is mostly correct. Different back planes cannot yet be sufficiently distinguished from this determination alone, e.g. that of the delivery van (53) driving ahead on the same lane from the signs of the sign gantry (54) arranged above it in the image. However, important information regarding where elevated objects occur in the surroundings of the vehicle can already be extracted from this representation.

Figure 7:
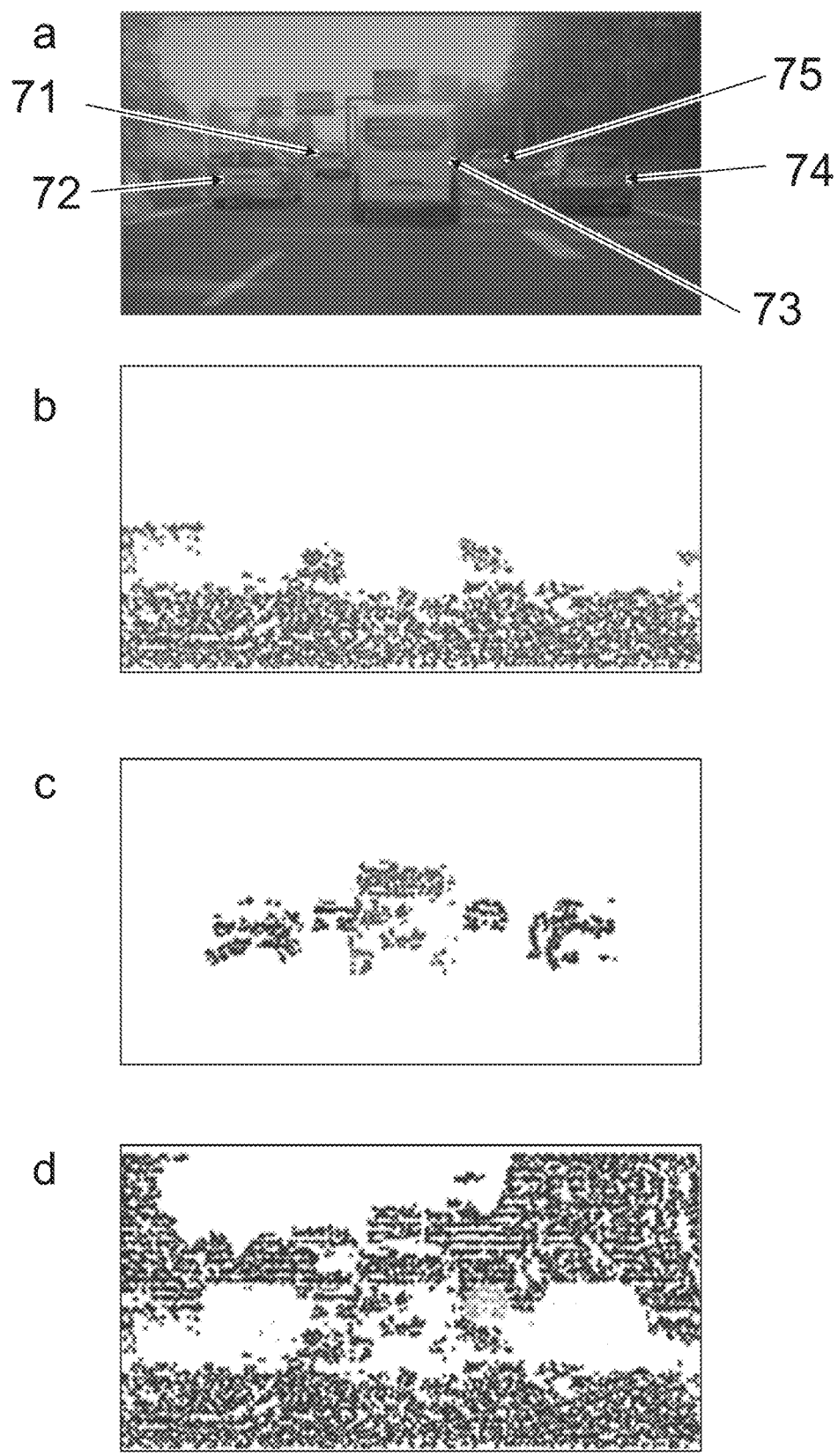
FIG. 7 shows time to collision monitoring.

As illustrated in FIG. 7, the inverse TTC $(t_x, t_y, t_z)$ can be used to identify dynamic objects.

FIG. 7a, in turn, shows the image of the vehicle situation (identical to FIG. 6a). The vehicle (73) driving ahead on the ego lane is a delivery van. Two vehicles (71 and 72) are driving on the left lane and two further vehicles (74 and 75) are driving on the right lane.

FIG. 7b shows correspondences which, in turn, correspond to the ground plane (violet in the original) and are the only ones to have a red proportion.

FIG. 7c shows correspondences which are associated with moving objects. These are green in the original if they are moving away from the ego vehicle (that is to say they are driving faster), or turquoise if they are driving more slowly.

FIG. 7d shows correspondences having a blue proportion, that is to say those which correspond to the ground plane (cf. FIG. 7b), moving objects which are approaching the ego vehicle (cf. FIG. 7c) and those which correspond to static elevated objects, these are only represented in FIG. 7d, such as e.g. woodland to the left and right of the motorway and the sign gantries. It can be seen from FIGS. 7c and 7d jointly that the vehicle (73) is approaching on the ego lane. The same applies to the front vehicle (75) on the right lane. On the other hand, the remaining vehicles (71, 72 and 74) are moving away.

Due to a lack of structure in the image, the region which corresponds to the sky in the image does not result in any correspondences (white in FIGS. 7b to 7d).

If the natural rotation is considered in the correspondences prior to the computation of the homography, or if the natural rotation is considered in the rotation matrix R, overtaking vehicles can be identified due to their negative $t_z$ component or swerving vehicles or vehicles driving in a curve can be identified by a nonzero lateral $t_x$ component. If the dynamic segments are predicted by means of their homographies (see "consolidation of the optical flux based on homographies" below), a dynamic map can be constructed over time.

If equation 3 is observed, it can be seen that segments having an inverse TTC equal to zero describe the rotation matrix and these can be established by computing a homography with a full degree of freedom (equation 2) from segments with t/d equal to zero. If it is assumed that the translatory components in the vicinity of the epipole cannot make themselves felt, the pitch rate and yaw rate can also be established by predicting the coordinates of the epipole $(x_e, y_e)$ through the homography of static segments and computing the atan $((x_{e0}-x_{e1})/f)$ or atan $((y_{e0}-y_{e1})/f)$ with the focal length based on one pixel. The pixel in a first camera image, at which the center of the camera is imaged at a second point in time, is designated the epipole. When the vehicle is driving straight ahead, the vanishing point corresponds e.g. to the epipole.

If a homography is computed with all degrees of freedom for each cluster, this can also be used to reconstruct the 3D surroundings in that, instead of the measured position $x_{t0}$, the predicted position $H^*x_{t1}$ is used for triangulation. This not only reduces the effect of measuring errors, but also makes it possible to reconstruct objects close to the epipole.

One embodiment example for consolidating the optical flux based on homographies is described below.

If the segmentation is known at the point in t−1, it can be used to both predict the objects and to generate a dense flux field. Signature-based flux methods produce signatures and cause these to be clearly associated in consecutive frames. The signatures are mostly computed from a patch (image section or image region) of a defined size. If, however, the size and form of a patch alter, it is no longer possible to find a correspondence with a fixed template (model, specimen, e.g. an image section of an image of the series of images, which corresponds to an object—for example a vehicle template—is meant). If e.g. one is approaching a back plane, the size of a patch changes. Or if one is moving over a ground plane or parallel to a side plane, both the size and the form of a patch change, see FIGS. 1 and 2). If the segmentation exists at the point in time t−1, the homoqraphies can be computed again by means of flux vectors which have already been found, and can be used to predict the position and form of already-established correspondences of t−1 to t−0.

Alternatively, the current frame at the point in time t−0 can be transformed to the earlier point in time t−1, in order to compensate for changes in scale and form.

If a back plane homography is computed from the image correspondences on the back of a vehicle or the front of a vehicle, this can likewise be used for the temporal prediction. A homography describes the movement of a point from t−1 to t−0. If the bounding box of a vehicle is known at the point in time t−1, it can be predicted for the point in time t−0. If the homography is calculated by means of RANSAC (RAndom SAmple Consensus), this additionally produces a significantly greater robustness with respect to local changes in intensity and, consequently, a robust estimate of the change in scale. In the case of the RANSAC (RAndom SAmple Consensus) method, a minimum number of randomly selected correspondences is usually used for each iteration, in order to form a hypothesis. A value, which describes whether the corresponding feature supports the hypothesis, is subsequently computed for each corresponding feature. If the hypothesis attains sufficient support through the corresponding features, the non-supporting corresponding features can be rejected as outliers. Otherwise, a minimum number of correspondences is selected again at random. Thus, for example, it is not possible for a template-based tracker to correlate a vehicle in consecutive frames, which differs due to the activation of the brake lights.

The following configuration forms or aspects are advantageous and can be provided individually or in combination:

1. Extract image correspondences in consecutive frames for the detection to be validated.
2. Compute the back plane, ground plane, and side plane homographies from the image correspondences, using the equations 9, 10 and 11.
3. Establish the homography with the smallest reprojection error.
4. The object detected is an elevated object, if the reprojection errors of the back or side plane homography are lower than the reprojection error of the ground plane homography.
5. Predict, for image-based tracking, the bounding box of the previous frame onto the current frame, by means of the back plane homography.

The invention claimed is:

1. A method of detecting and validating objects, comprising the steps:
   a) with a camera of a vehicle, capturing a series of images including a first image at a first time and a second image at a second time after the first time;
   b) detecting a potential collision object in at least one of the images;
   c) determining feature pairs of corresponding first and second features in an image region of the potential collision object respectively in the first and second images;
   d) associating a plurality of the feature pairs with a spatial plane selected from the group consisting of a ground plane normal to a Y-axis, a back plane normal to a Z-axis, and a side plane normal to an X-axis, wherein the Z-axis extends in a longitudinal direction of the vehicle, the X-axis extends horizontally and laterally relative to the Z-axis, and the Y-axis extends vertically; and
   e) validating the potential collision object as a validated collision object only when the spatial plane to which the plurality of feature pairs has been associated is the back plane or the side plane, which indicates that the validated collision object is an elevated object that is elevated above the ground plane.

2. The method according to claim 1, wherein the associating of the feature pairs with the spatial plane comprises computing homographies and using the homographies to associate the feature pairs with the spatial plane.

3. The method according to claim 2, wherein the homographies describe correspondences of points or features in the first image at the first time with corresponding points or features in the second image at the second time.

4. The method according to claim 2, wherein the associating of the feature pairs with the spatial plane comprises:
   measuring an actual correspondence of the first and second features in the first and second images,
   computing respective ones of the homographies respectively for the ground plane, the back plane and the side plane,
   projecting the first feature from the first image as a projected feature respectively onto the ground plane, the back plane and the side plane using respective applicable ones of the homographies,
   determining respective predicted correspondences based on the projected feature respectively on the ground plane, the back plane and the side plane,
   determining respective reprojection errors as respective differences between the actual correspondence and the predicted correspondences respectively for the ground plane, the back plane and the side plane, and
   selecting, as the spatial plane to which the feature pairs are associated, the one of the ground plane, the back plane and the side plane for which the respective reprojection error is the smallest among the reprojection errors.

5. The method according to claim 2, wherein the associating of the feature pairs with the spatial plane comprises associating the feature pairs with the one of the ground plane, the back plane and the side plane for which a respective reprojection error for the feature pairs is smallest among respective reprojection errors of the ground plane, the back plane and the side plane, wherein the reprojection errors respectively indicate respective differences between an actual correspondence of the first feature in the first image and the second feature in the second image, and predicted correspondences based on the homographies.

6. The method according to claim 2, wherein a respective one of the homographies is computed for the back plane in accordance with:

$$\begin{bmatrix} x_0c - a \\ y_0c - b \\ \vdots \end{bmatrix} = \begin{bmatrix} -x_1 & 0 & x_1x_0 \\ 0 & -x_1 & x_1y_0 \\ & \vdots & \end{bmatrix} \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$, and $t_z$ are components of a vector t/d, t describes a translation of the camera, and d describes a distance from the respective plane.

7. The method according to claim 2, wherein a respective one of the homographies is computed for the ground plane in accordance with:

$$\begin{bmatrix} x_0c - a \\ y_0c - b \\ \vdots \end{bmatrix} = \begin{bmatrix} -y_1 & 0 & y_1x_0 \\ 0 & -y_1 & y_1y_0 \\ & \vdots & \end{bmatrix} * \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$ and $t_z$ are components of a vector t/d, t describes a translation of the camera, and d describes a distance from the respective plane.

8. The method according to claim 2, wherein a respective one of the homographies is computed for the side plane in accordance with:

$$\begin{bmatrix} x_0c - a \\ y_0c - b \\ \vdots \end{bmatrix} = \begin{bmatrix} -1 & 0 & x_0 \\ 0 & -1 & y_0 \\ & \vdots & \end{bmatrix} \begin{bmatrix} t_x \\ t_y \\ t_z \end{bmatrix}$$

wherein a, b and c are constants, $x_1$ and $y_1$ are coordinates of the first feature in the first image, $x_0$ and $y_0$ are coordinates of the second feature in the second image corresponding to the first feature in the first image, $t_x$, $t_y$, and $t_z$ are components of a vector t/d, t describes a translation of the camera, and d describes a distance from the respective plane.

9. The method according to claim 1, further comprising tracking the potential collision object in an image-based manner in the course of the series of images.

10. The method according to claim 9, further comprising determining a bounding box of the potential collision object, and wherein the tracking of the potential collision object uses the bounding box.

11. The method according to claim 10, wherein:
the associating of the feature pairs with the spatial plane comprises computing respective homographies for the ground plane, the back plane and the side plane, and using the homographies to associate the feature pairs with the spatial plane, and
the bounding box determined for the potential collision object in the first image is predicted onto the second image by using the homography of the back plane.

12. The method according to claim 1, further comprising performing a driver assistance function of a driver assistance system of the vehicle in response to and dependent on the validated collision object and not in response to the potential collision object before the validating thereof.

13. A device for detecting and validating objects, comprising a camera controller and evaluation electronics, wherein:
the camera controller is configured to capture, with a camera of a vehicle, a series of images including a first image at a first time and a second image at a second time after the first time,
the evaluation electronics are configured:
to detect a potential collision object in at least one of the images;
to determine feature pairs of corresponding first and second features in an image region of the potential collision object respectively in the first and second images;
to associate a plurality of the feature pairs with a spatial plane selected from the group consisting of a ground plane normal to a Y-axis, a back plane normal to a Z-axis, and a side plane normal to an X-axis, wherein the Z-axis extends in a longitudinal direction of the vehicle, the X-axis extends horizontally and laterally relative to the Z-axis, and the Y-axis extends vertically; and
to validate the potential collision object as a validated collision object only when the spatial plane to which the plurality of feature pairs has been associated is the back plane or the side plane, which indicates that the validated collision object is an elevated object that is elevated above the ground plane.

14. The device according to claim 13, wherein the camera is a single mono-camera, and the device does not include and does not use a radar or lidar sensor.

\* \* \* \* \*